Figure 1:
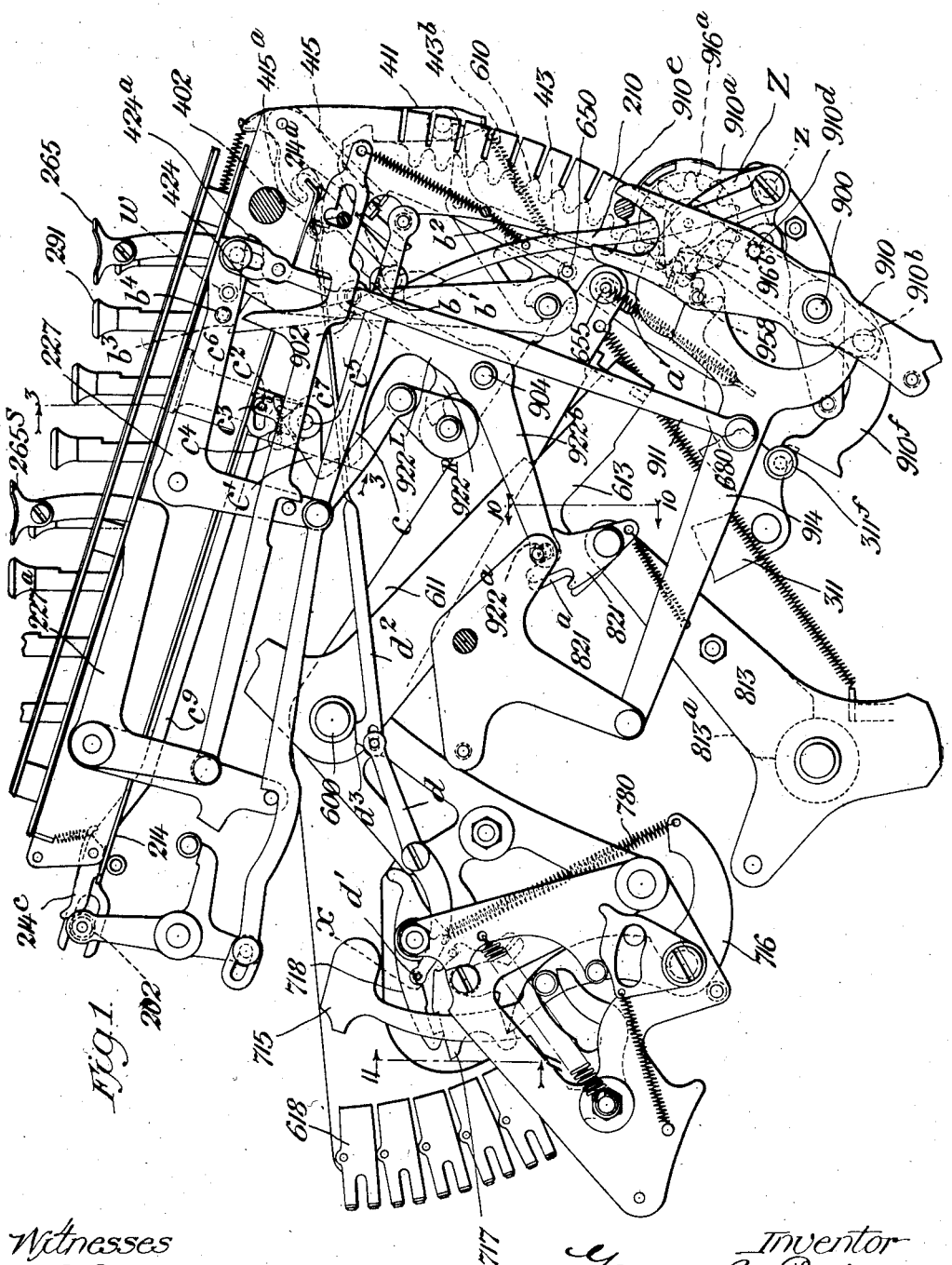

G. B. PUTNAM.
ADDING AND LISTING MACHINE.
APPLICATION FILED OCT. 21, 1909.

998,716.

Patented July 25, 1911.

5 SHEETS—SHEET 1.

Witnesses
E. R. Barrett
Louis B. Erwin

Inventor
George B. Putnam
Rector Hibben Davis
his Attys.

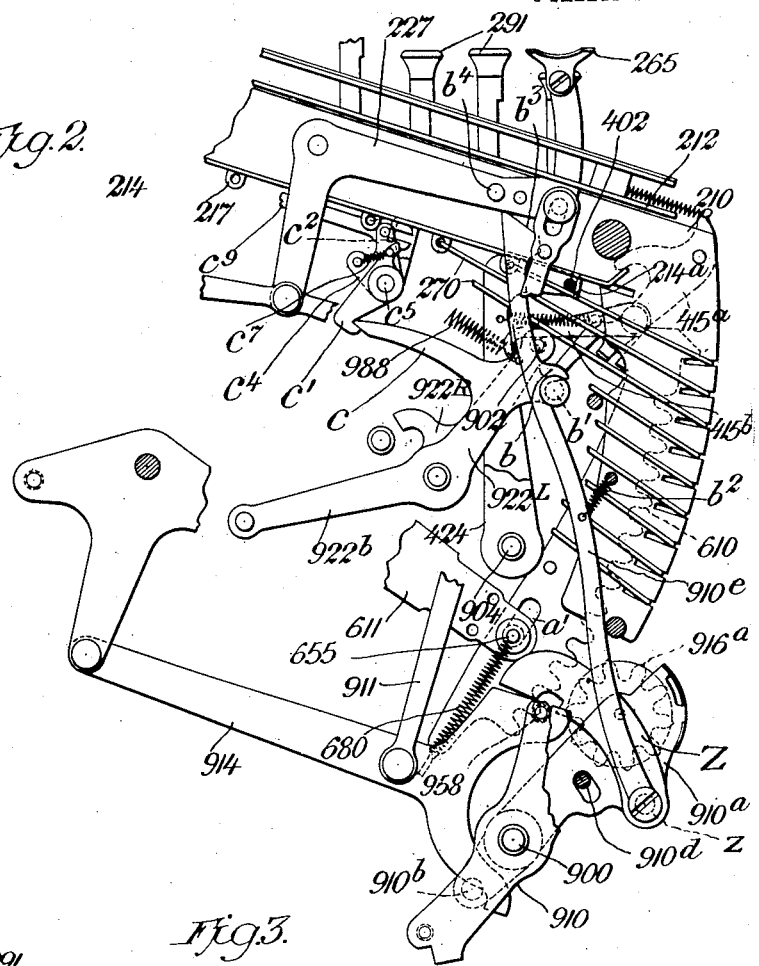
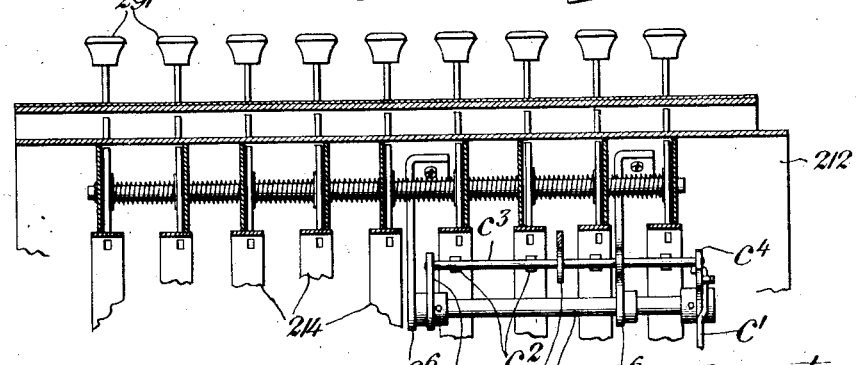

G. B. PUTNAM.
ADDING AND LISTING MACHINE.
APPLICATION FILED OCT. 21, 1909.
998,716.
Patented July 25, 1911.
5 SHEETS—SHEET 3.
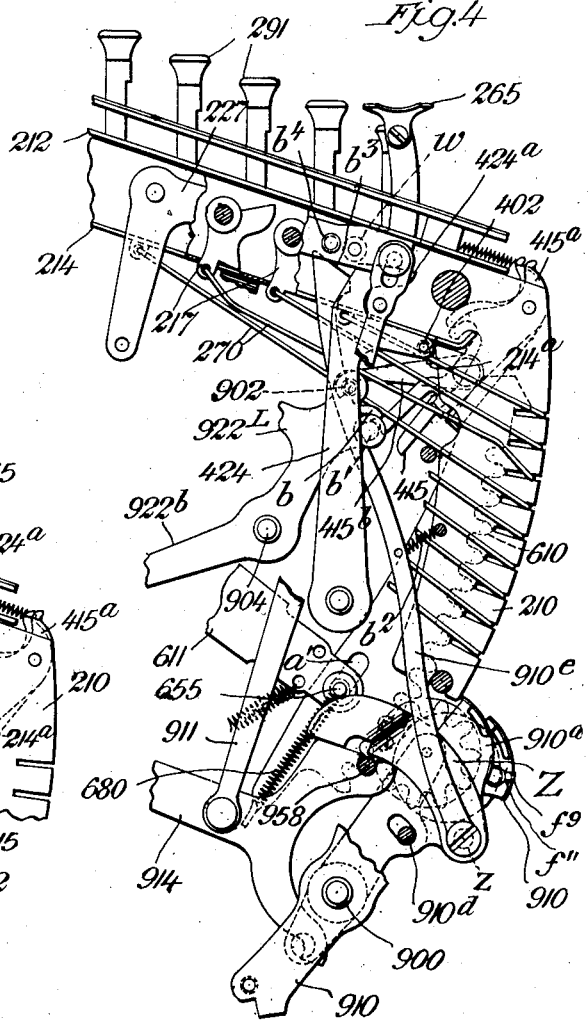
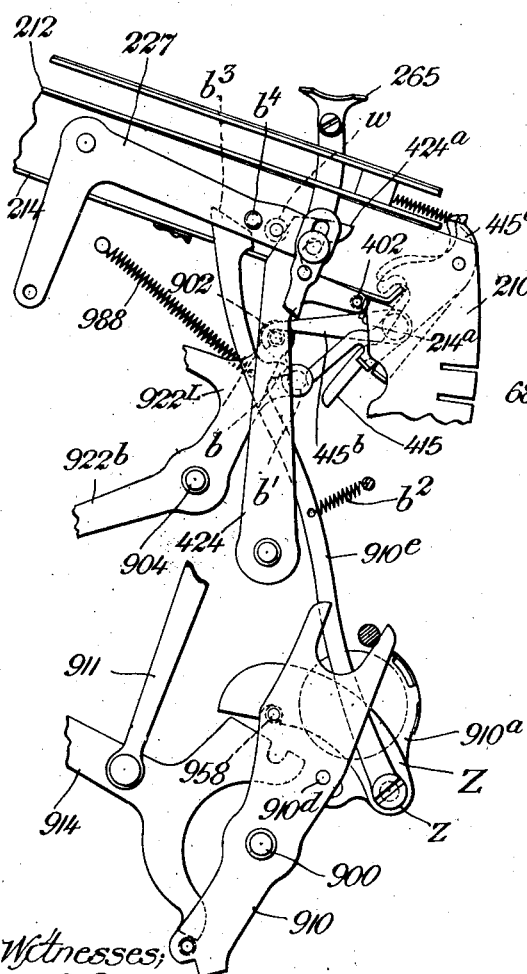
Witnesses:
E. R. Barutt
Louis B. Erwin
Inventor
George B. Putnam
Poster Hubbard Davis
his Attys.

G. B. PUTNAM.
ADDING AND LISTING MACHINE.
APPLICATION FILED OCT. 21, 1909.
998,716.
Patented July 25, 1911.
5 SHEETS—SHEET 4.
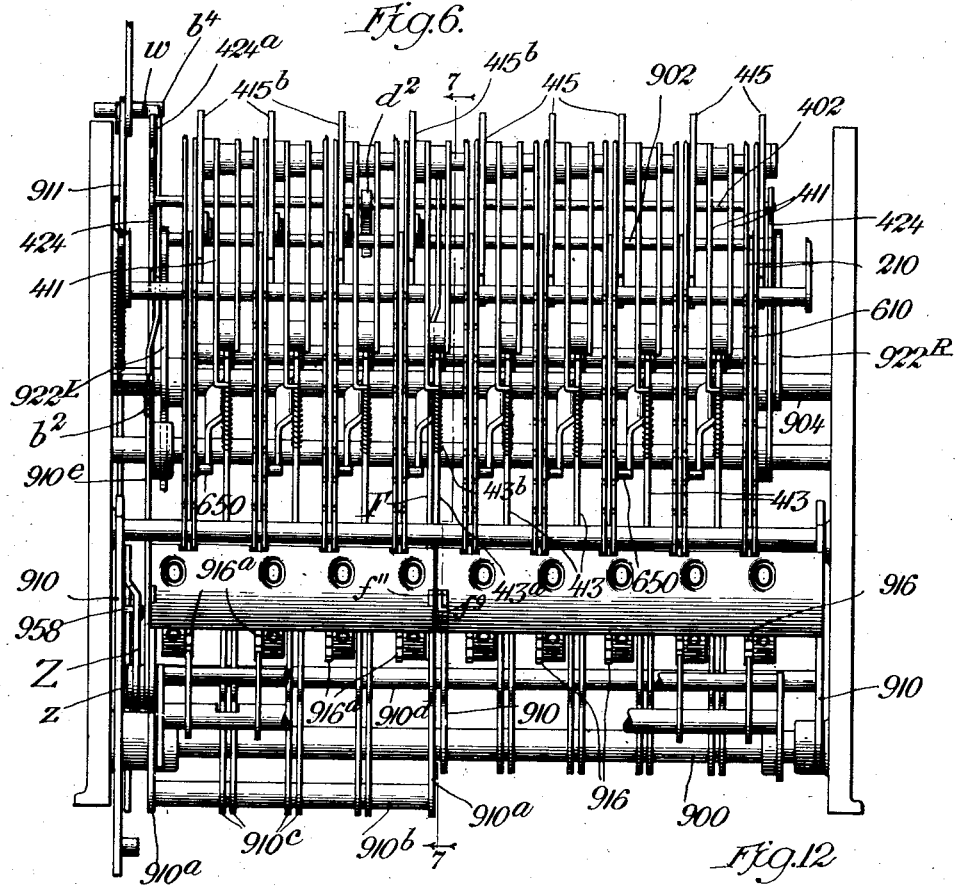
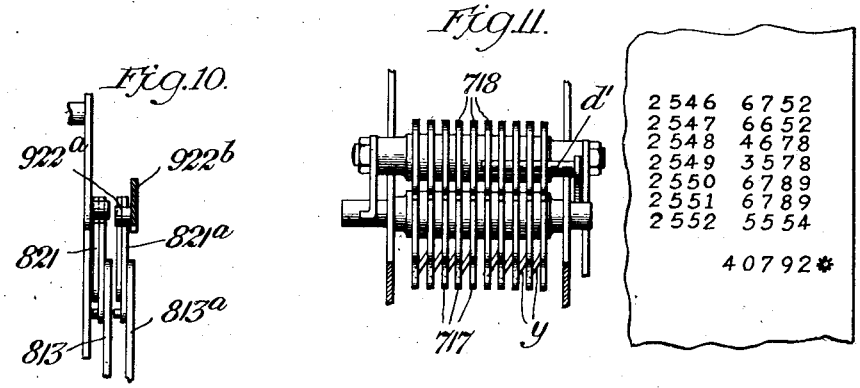
Witnesses:
E. R. Barrett
Louis B. Erwin
Inventor
George B. Putnam
by Rector Hibben Davis
his Attys.

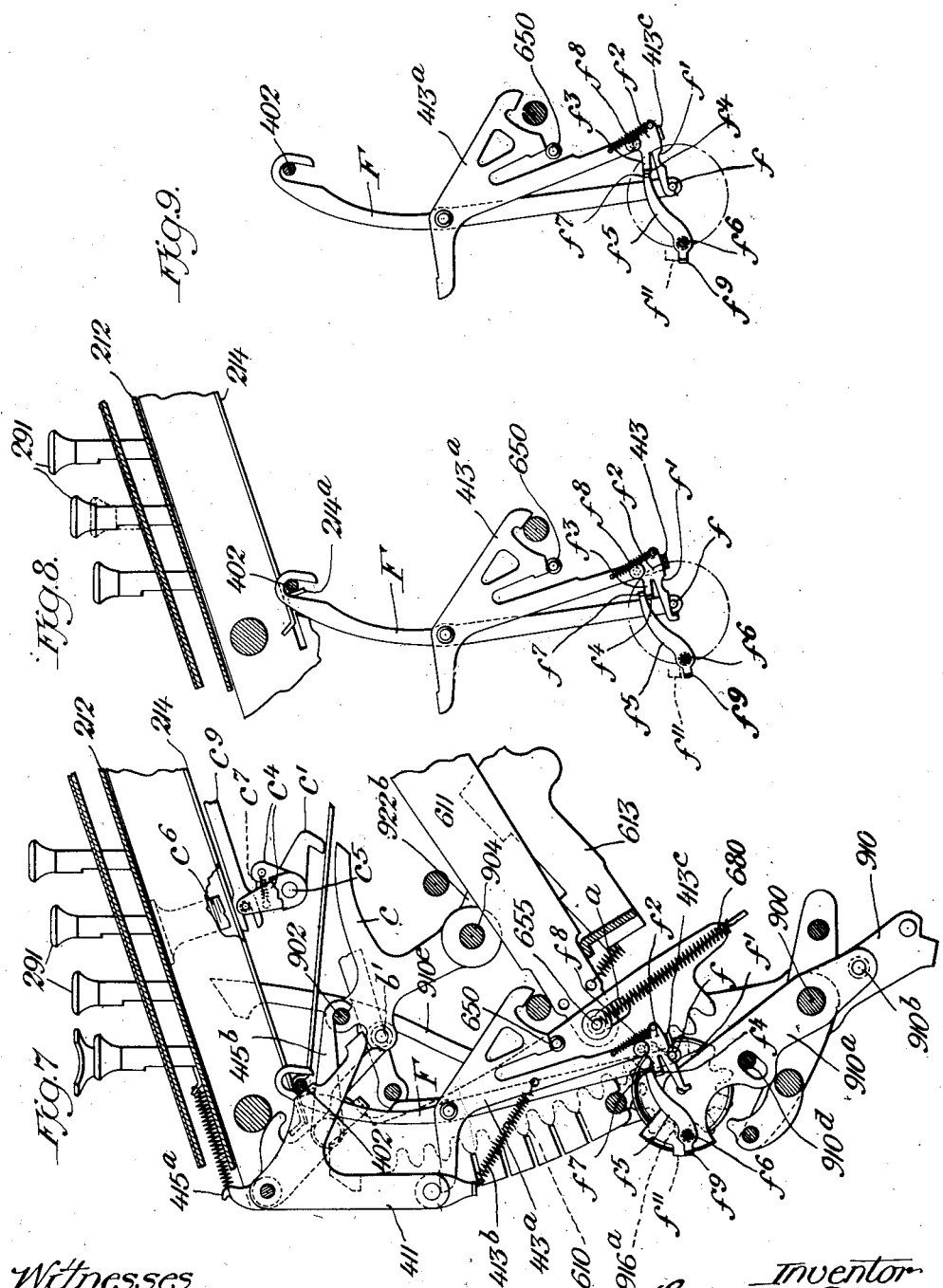

UNITED STATES PATENT OFFICE.

GEORGE B. PUTNAM, OF SEARSPORT, MAINE, ASSIGNOR TO BURROUGHS ADDING MACHINE COMPANY, OF DETROIT, MICHIGAN, A CORPORATION OF MICHIGAN.

ADDING AND LISTING MACHINE.

998,716.  Specification of Letters Patent.  Patented July 25, 1911.

Application filed October 21, 1909. Serial No. 523,823.

*To all whom it may concern:*

Be it known that I, GEORGE B. PUTNAM, a citizen of the United States, residing at Searsport, in the county of Waldo and State of Maine, have invented certain new and useful Improvements in Adding and Listing Machines, of which the following is a specification.

The object of the present invention is to so equip an adding and listing machine that in connection with the printing of a series of added amounts there may be printed consecutive numbers, beginning with whatever number may happen to be the proper one for the first amount recorded.

In machines of the kind to which I have here shown my invention applied there are usually a series of amount keys which set stops for reciprocating racks and there is a series of adding pinions movable into and out of engagement with the racks and the order of engagement and disengagement between racks and pinions and the period of engagement will be regulated according to whether amounts are being added upon the pinions or totals extracted therefrom.

By the present invention as it is here shown carried out, certain of the pinions are appropriated to the work of registering consecutive numbers and by reverse rotation setting up such numbers to be successively printed. This setting up of consecutive numbers involves an operation similar to that commonly performed in machines of this kind when striking what is termed a sub-total. It is common in this type of machine to effect the transfer or carrying movements of pinions by return movement of racks one step beyond normal. In the present embodiment of my invention the consecutive number registration is effected by a similar use of racks. Thus it is provided that whenever there is an accumulating operation upon the pinions which add up the amounts, there shall occur this one-step movement beyond normal of the rack associated with the units pinion of the section of pinions appropriated to the consecutive numbering work. When such one-step movement of the rack is taken up in a subsequent operation this consecutive numbering section of pinions will be momentarily disengaged from its racks but will be immediately reëngaged so that there will be backward turning of pinions to set up the number. However, provision is made for preventing the printing of such number unless the operation is one which accumulates an amount upon the other pinions. The consecutive numbering section of pinions will remain in mesh with their racks so that having by reverse rotation set up the number, these pinions will turn forward again so as to continue to register this number increased by one, due to the one-step movement past normal of the units' consecutive numbering rack, if the operation was an adding one. Of course eventually the consecutive numbering pinions should be cleared and the present invention provides for this in connection with a grand totaling operation by which the other pinions are cleared. In such an operation all pinions remain in mesh with racks to be turned backward to zero thereby and all move out of mesh with the racks so as to be left at the zero positions, but though the last consecutive number will have been set up in type it will not be printed. There would, of course, be no object in printing the consecutive number opposite the amount total.

While, as before stated, there will be a reëngagement of the consecutive numbering pinions with their racks in order to provide for setting up the number by backward rotation of said pinions, such reëngagement will not occur when at the outset of a series of operations an initial or basic number is to be recorded. This will be done by setting up on the keyboard such initial or basic number at the same time that the first amount to be added is set up on the keyboard. The registering of the initial or basic number will take place in the same manner that registering of the first amount takes place. Thus the racks appropriated to the consecutive numbering work will drop distances determined by the depressed keys, while the pinions are disengaged from them, and then said pinions will be engaged with the racks for the return movement of the latter. This involves disablement of the means for reëngaging the pinions with the racks as hereinbefore referred to, and such reëngagement will simply accompany the reëngagement of the balance of the pinions as in the ordinary operation of adding in machines of this general type.

With the above stated and incidental objects in view the invention consists in certain novel features of construction and combinations of parts, the essentials whereof are recited in the appended claims and a preferred form or embodiment of which is specifically described hereinafter and illustrated in the accompanying drawings which form part of this specification.

Of said drawings Figure 1 represents in left side elevation a machine of the well known Burroughs type having incorporated therein a construction embodying the present invention, the outside supporting frame work and casing of the machine being omitted and the interior movable part shown at normal. Fig. 2 is a similar view of a portion of the mechanism with parts illustrated as they appear when the initial number to start a consecutive series has been set upon the keyboard and the handle of the machine drawn forward; Fig. 3 is a cross section taken on the line 3—3 of Fig. 1; Fig. 4 is a view similar to Fig. 2 but illustrates a different condition, to wit, that which obtains when an amount has been set up on the keyboard, the handle drawn forward and the consecutive number printed with an increase of one unit over the initial number or the number printed in the preceding operation of the machine; Fig. 5 is a view similar to Figs. 2 and 4 but showing a different positioning of parts due to depression of the total key, the handle of the machine in this case being at normal; Fig. 6 is a front elevation of the principal portion of the machine with parts at normal; Fig. 7 is a vertical section on the line 7—7 of Fig. 6 looking toward the left of the machine; Figs. 8 and 9 are views similar to Fig. 7, though illustrating a limited number of the parts shown in the latter and those parts at different stages of the operation which causes registration of consecutive numbers; Fig. 10 is a detail sectional view taken on the line 10—10 of Fig. 1; Fig. 11 is a sectional detail view taken substantially on the line 11—11 of Fig. 1; and Fig. 12 shows an example of work done by the machine.

The invention is here illustrated as incorporated in a machine of the well known Burroughs type exemplified in numerous prior patents, of which it will suffice to mention the William S. Burroughs Patents, Nos. 504,963 and 505,078, issued Sept. 12, 1893, the Macauley Patent, No. 823,474, issued June 12, 1906, and the Vincent Patent, No. 913,860, issued March 2, 1909. As is usual in machines of this type, the machine here shown has a number of rows of depressible amount keys 291 which operate through spring-held bell cranks 217 upon stop rods 270, the latter having laterally turned front end portions occupying slots in upright fixed plates 210 between which are located segmental racks 610. These racks are carried as usual upon the forward ends of a series of levers 611 freely mounted upon a rock shaft 600, said levers extending in rear of the latter and each carrying a series of type plates 618. The usual swinging frame or bail 613 is secured to said rock shaft 600 and normally upholds the forward ends of the levers 611 and the latter as usual have studs 655 occupying slots $a'$ in the respective racks, said studs being connected to the lower extremities of the racks by springs 680. There are the usual studs 650 on the racks normally bearing upwardly against the end edges of pivoted pawls 413, which coact in the usual manner with latches 411. For the purposes of the present invention one of these pawls, specially designated 413$^a$, (Figs. 7 to 9) is modified in construction as will be specifically explained hereinafter.

While the above mentioned elements with the exception of said specially constructed pawl have the same characteristics as to make-up and function as heretofore, their uses are modified for the purposes of the present invention. Thus a number of rows of keys (in the present instance four) at the left of the keyboard, are employed only for setting up the initial or basic number to start a consecutive series, the remaining rows of keys and associated parts alone serving to set up, accumulate and print amounts and record totals of amounts. In the present instance there are five of these remaining rows of keys and five corresponding pinions 916 (Fig. 6) which coact with the racks 610 controlled by said five rows of keys to perform the customary adding function. These pinions are mounted as usual in a rocking frame 910 carried by a shaft 900 and operated by the usual pitman 914. There are similar pinions 916$^a$ which coact respectively with the four left-hand racks, but these pinions are mounted in a separate rocking frame journaled upon the shaft 900 and comprising side plates 910$^a$, cross pieces 910$^b$ and intermediate plates 910$^c$. A cross rod 910$^d$ of the rocking frame 910 passes through slots in the plates of the second rocking frame and the latter is capable of movement independent of the frame 910, the length of these slots which is sufficient to carry the pinions 916$^a$ into and out of engagement with their racks. Normally these pinions 916$^a$ are in mesh with their racks as are the other pinions 916 as shown in Fig. 1. However, when the consecutive numbering is in progress, after the registering and recording of the initial number, said pinions 916$^a$ will not be disengaged from their racks during advance or lowering of the latter, as will the other or regular pinions 916 when the racks which operate the latter are descending in preparation for the accumulation of an amount.

There are the usual latches 415, one for each rack, which latches are individually displaceable by slide strips or bars 214 operated by the bell cranks 217, but in the case of the latches 415ᵃ which belong to the four left-hand racks, these latches are normally displaced and though momentarily restored at the outset of an operation are again displaced to leave these particular racks free to descend distances determined by backward rotation of the pinions 916ᵃ to zero, as in the familiar totaling or sub-totaling operation practiced with a machine of this type. This novel control of the four left-hand latches 415ᵃ is due to their connection with a bail of similar character to one familiar in this type of machine and similarly located though differently timed in its operations. This bail comprises side pieces 922ᴸ and 922ᴿ, both secured to a rock shaft 904 and carrying between their upper ends a cross rod 902. Each of the four left-hand latches 415ᵃ has pivotally attached to it a hook 415ᵇ which takes over said cross rod 902, as clearly shown in Fig. 7 (see also Fig. 6). Said bail is drawn rearward by a spring 988 superior to the springs which as usual tend to swing the latches forward, and hence the bail by draft upon the hooks 415ᵇ holds the latches rearward disengaged from their racks as shown in Figs. 1 and 7.

The aforesaid bail, unlike the somewhat similar bail employed in previous machines, is vibrated at the very outset of an operation of the machine, thereby permitting the latches to restore but immediately retracting them unless means come into play as hereinafter explained to prevent the latter action. The point to be noted here is that these particular latches are disengaged from the corresponding racks so that the latter may descend as the handle of the machine is drawn forward, without regard to depression of keys of the corresponding rows. As to the additional functions of the aforesaid bail, it serves to permit the pinions 916ᵃ to become disengaged from their racks at the very outset of an operation and then serves to immediately reëngage said pinions with their racks. The occasion for disengaging these pinions thus momentarily arises through the necessity of permitting the taking up of the one-step additional return movement of a rack or racks associated with such pinions without affecting the pinions, so that in backward turning of the pinions thereafter the type corresponding with the registered consecutive number will be brought to the printing line. This will be further alluded to when I come to a detailed description of the construction and mode of operation of parts whereby numbers are consecutively registered and printed. I shall first explain how the initial or basic number is registered upon the pinion 916ᵃ and printed with the first amount registered upon the other pinions printed along the same horizontal line with the initial number. I have already stated that the aforesaid bail is vibrated at the outset of an operation of the machine. This is effected by the action against a stud 922ᵃ of a downwardly and rearwardly projecting arm 922ᵇ of said bail, of a wipe pawl 821ᵃ similar to the familiar wipe pawl 821 and mounted in the same way upon an arm 813ᵃ secured to the familiar arm 813. Now, when the initial number is to be registered, the said bail should not immediately swing back after having been swung forward by said wipe pawl 821ᵃ for the latches must then be under control of the keys used to set up the initial number. Furthermore, as has been stated the swinging forward of said bail permits the pinions 916ᵃ to disengage from their racks, and it is necessary when registering the initial number that these pinions remain so disengaged during the descent of the racks. Therefore, means are provided under control of the four left-hand banks or rows of keys 291, whereby the bail is detained in its forward position until near the close of the operation of the machine, the pinions 916ᵃ being returned to engagement with their racks at the same time the other pinions 916 are returned to engagement with their racks, as in the ordinary adding operation in machines of this type. There is a long link 910ᵉ pivotally connected at its lower end to the left side plate of the second rocking frame which carries the pinions 916ᵃ, and this link at an upper point is formed with a lug $b$ which normally engages over a stud $b'$ on a forward projection of the left side piece 922ᴸ of the aforesaid bail, a spring $b^2$ applied to said link serving to enforce this engagement of lug and stud, as shown in Fig. 1.

It will be understood that the cross rod 910ᵇ of the rocking frame 910 normally occupies the rearward ends of the slots in the second rocking frame. Consequently when the frame 910 is swung forward at the outset of an operation it would not necessarily be accompanied by the second frame. However, as the aforesaid bail rocks forward the said stud $b'$ lowers permitting the second frame with its pinions to drop by gravity. Now, if the bail immediately swings back the stud $b'$ acting upon the lug $b$ would pull the pinions 916ᵃ back into mesh with their racks. To prevent this in the case of registering the initial number the left side plate of the bail is formed with a rearwardly projecting curved and beveled finger $c$ adapted to be engaged by a latch $c'$, the latter rendered effective by depression of any one of the keys in the four left hand rows. To this end the slide strips or bars 214 belonging to those rows of keys are formed at an intermediate point with pendent lugs $c^2$ which engage the cross rod $c^3$ of a bail (Fig. 3) comprising side pieces $c^4$ secured to a rock shaft $c^5$ journaled in brackets $c^6$ which depend from the lower plate 212 of the keyboard. The aforesaid latch $c'$ is loosely mounted upon said shaft $c^5$ and has a portion projecting above the shaft and bent over in front of the left hand side piece of the bail and also connected by a spring $c^7$ with said side piece, as clearly shown in Fig. 2. Normally the bail stands forward and the acting end of the latch $c'$ is above the path of movement of the finger $c$ as illustrated in Fig. 1. However, rearward movement of any one of the slide strips or bars 214 having the lugs $c^2$, will obviously swing the bail rearward and through the medium of the spring $c^7$ carry the latch along until it strikes the top of the finger $c$, when the spring will be put under tension. It follows that when the first mentioned bail $922^{\text{L}}$ swings forward, said finger will wipe past the end of the latch and be caught thereby as illustrated in Fig. 2. Thereby the pinions $916^{\text{a}}$ will be caused to remain out of mesh with their racks until when the operating handle starts back these pinions will swing into mesh with said racks as the other pinions 916 move into mesh with other racks, this being due to the fact that the cross rod $910^{\text{d}}$ is still at the rear ends of the slots in the secondary frame and consequently when the main frame 910 swings back it carries the secondary frame with it.

It will, of course, be understood that depression of a key or keys in the four left-hand rows besides detaining one or more latches 415 disengaged from racks, will set an appropriate stop or stops for a rack or racks to limit the descent of the latter the same as in any ordinary adding operation. Hence, when the said racks return the number will of course be registered upon the pinions $916^{\text{a}}$. It is to be assumed in this connection that a key or keys in the remaining rows have also been depressed, so that an amount is registered upon the pinions 916. Unless this has been done the initial number so registered will not be printed but will simply stand on the pinions to be printed when an amount is registered upon the pinions 916, but, of course, it is not to be supposed that the initial number would be registered separately from the amount to which it belongs.

The impression devices are of the ordinary kind comprising pivoted hammers 715, hammer-driving levers 716, restraining latches 717 and pawls 718, connected by springs 780 with said hammer-driving levers. In order to prevent the printing of the number except when an amount is registered and printed, as well as to prevent printing of the consecutive number in a totaling or sub-totaling operation, the four left-hand pawls 718 are formed with cam notches $x$ in the underside in rear of their pivots and a lever $d$ is pivoted to the frame work intermediate its end and carries at the rear end a laterally projecting pin $d'$ which extends under said pawls as illustrated in Fig. 11, occupying the notches in the same so that in forward swinging of the latter they will be carried up by action of the notch-sides against the pin, preventing their displacing the associated latches 717. The forward arm of the said lever $d$ has a stud engaging a slot in the rear end of a thrust bar $d^2$, the latter at its forward end being hooked over the cross rod 402 of the familiar bail 424 which swings rearward whenever an amount key is depressed. The bar $d^2$ has a step $d^3$ on the upper side at the rear end, which step normally engages under the shaft 600. Rearward movement of the said bar caused by depression of one or more amount keys carries said step sufficiently to the rear of the shaft 600 to permit rocking of the lever $d$ and lowering of the pin $d'$ so as to eliminate the camming action before mentioned and permit the pawls 718 to remain in engagement with their latches 717 as the pawls swing forward though, of course, if no keys of the left-hand or consecutive numbering section are depressed the pawls will be lifted by the regular camming action of their upturned forward ends against the inclined shoulders of the type-carriers. It will thus be seen that unless the amount keys are depressed the said latches will not be released and there will be no printing of the number which is set up by reason of the descent of racks associated with said latches. The slide strips 214 operated by keys of the four left-hand rows are minus the lugs $214^{\text{a}}$ which operate in the usual manner upon the cross rod 402. Hence, only depression of a key or keys of the five right-hand rows will permit the printing of the number.

At the conclusion of an operation such as above described, wherein the initial number is registered and recorded, the latch $c'$ will be disengaged from the finger $c$ so as to leave the parts ready for consecutive numbering work to be performed in a manner hereinafter described. For the purpose of so disengaging said latch I utilize the familiar key-restoring bail whose crossrod, acting as usual to lift the detents $214^{\text{c}}$ and thrust forward the detent strips 214, is designated 202 and in the present instance is embraced by the bifurcated rear end of a thrust bar $c^9$, the latter having a bifurcated forward end which embraces the cross rod $c^3$ of the latch operating bail. It will be understood that, as in previous constructions, the said key-restoring bail is rocked forward at the conclusion of an operation of the machine. Its cross rod 202 will then thrust the bar $c^9$ forward, thereby rocking said latch-operating pawl forward and disengaging the latch by reason of the action of the left side piece of the bail against the bent over portion of the latch.

Coming now to the means for successively adding units to the consecutive number registration as additional amounts are registered and recorded, I again utilize the bail rod 402 as a means for controlling certain devices which affect a one-step turning of the units pinion 916$^a$. Thus there is hooked over said cross rod the upper end of a lever F (see Figs. 7, 8 and 9) which lever is pivoted concentrically with the special transfer or carrying pawl 413$^a$ hereinbefore mentioned. The lower end of said lever carries a stud $f$ which normally occupies a cam recess $f'$ in the underside of an abutment piece $f^2$ pivoted to said pawl. A branch $f^3$ of said abutment piece has a laterally turned end portion $f^4$ which lies under the curved arm of a tappet piece $f^5$ pivoted to the rocking frame 910 at $f^6$. This tappet piece has a laterally turned rear end portion $f^7$ overlying the branch $f^3$ of the abutment piece. Normally the latter is held down by a spring $f^8$ connecting it to the pawl 413$^a$. The tappet piece $f^5$ is also in a lowered position, due to gravity, wherein an angular forward extension $f^9$ of the same bears against a shoulder $f''$ of the rocking frame 910, all as illustrated in Fig. 7. Now, when a key or keys of the five right hand rows is depressed, and the bail 402 consequently swung rearward, the lever F is rocked carrying its lower arm forward and causing its stud $f$ to cam the abutment piece $f^2$ upward tensioning the spring $f^8$ and lifting the tappet piece $f^5$ as shown in Fig. 8. When, thereafter, the frame 910 is rocked forward the tappet piece of course goes along with it and the result is that the laterally turned rear end portion of said tappet piece is carried beyond the abutment piece, whereupon the tappet piece drops by gravity to the position shown in Fig. 9 with its said laterally turned portion confronting the laterally turned portion of the branch $f^3$ of the abutment piece. Then when the accumulator frame 910 rocks rearward the tappet piece swings the pawl 413$^a$ back, disengaging it from the stud 650 on the rack of the units pinion 916$^a$. Consequently, when the restoring frame 613 swings up it will, in its final movement, carry said rack one step upward beyond normal, as happens in the familiar transfer or carrying operation in a Burroughs machine. This, of course, turns the units pinion 916$^a$ one step forward adding a unit to the registration. At the conclusion of the operation the bail rod 402 of course swings forward, rocking the lever F back to normal, but this would not carry the stud $f$ to the recess $f'$ because the latter has been carried rearward, and so the abutment piece $f^2$ would continue to be upheld by said stud and the engagement between the laterally turned portions of the tappet piece and abutment piece would continue, as shown in Fig. 9. In a subsequent operation involving the registering and recording of an amount, the pawl 413$^a$ would be swung forward by its spring 413$^b$ when in the lowering of the abnormally raised rack its stud 650 passed below the acting edge of said pawl, the frame 910 having in the meantime rocked forward carrying with it the tappet piece $f^5$, but the latter would still be in line with the laterally turned portion of the abutment piece so that when the frame 910 again rocked rearward the effect heretofore described would be repeated and another unit would be added to the consecutive number registration, it being understood of course that the lever F was again rocked as the result of setting up the new amount upon the keyboard. In the event of a blank operation of the handle when the frame 910 would be rocked without said lever F having been again moved from normal, the restoration of the pawl 413$^a$ would carry the recess $f'$ over the stud $f$ and then the parts would resume normal relations, such as illustrated in Fig. 7. The rearward swing of the pawl 413$^a$ is limited by the engagement of a downturned end portion of the lower branch of the abutment piece $f^2$ with the stud $f$ as illustrated in Fig. 9.

The special transfer or carrying pawl 413$^a$ is provided with the usual foot 413$^c$ which serves to stop the highest amount accumulator wheel at zero when such wheel is turned backward as in the taking of a total or sub-total. In this connection it should be noted that the usual means are provided to compel a blank or spacing stroke of the operating handle before the total or sub-total key can be depressed. Therefore the circumstance that with the adding of the last of a series of items or amounts said foot would be standing in a rearward position out of line with the transfer pin or stud or cam, as the case may be, will not deprive such foot of its customary function since in the taking of a blank stroke the parts will be restored to normal as above described, leaving the foot in the path of such pin, stud or cam. In the present instance the accumulating or counting wheels are shown equipped with the familiar snail-back cam 916$^b$ for transfer tripping or zero stopping purposes.

The locking means above mentioned for preventing depression of total or sub-total key without first taking a blank or spacing stroke comprises the usual upward extension 424$^a$ of the left side piece of the bail 424 hereinbefore mentioned, and the usual stud $w$ on the total key bell crank lever 227. It will be understood that said bail is as usual prevented from restoring after a series of adding operations, by the abutment of its cross rod against portions of the transfer latches 411 and the extension 424ª is kept under the stud w until in a blank operation the said latches are restored to normal.

The carrying of tens between wheels of the counting section takes place in the ordinary way, the cam of the units counting wheel in passing from 9 to 0 tripping a transfer or carrying pawl of regular construction and arrangement which pawl releases the rack of the tens counting wheel, and so on.

It is, of course, necessary that the usual tripping action between impression devices be suspended between the devices which coöperate with consecutive numbering type carriers and those which coöperate with amount type carriers. This is effected in a well known manner, to wit, by simply omitting or removing the overlapping tail of the fourth latch 717 from the left, or as the parts are seen in Fig. 11, viewed from the rear, the fourth latch 717 from the right. The familiar overlapping tails are here designated by the reference letter y. Of course, it is not desirable to print a consecutive number in association with a total or sub-total. The accumulator will at the time contain a consecutive number one higher than the last recorded consecutive number and in operating the machine for total or sub-total the consecutive numbering wheels will be turned to zero along with other wheels which accumulated the amounts, and so such consecutive number will be set up in type along with the total. It will not, however, be printed, for the reason that, no amount keys 291 having been depressed, the thrust bar $d^2$ will not have been moved rearward and hence the pin $d'$ Fig. 1, will be up and consequently when the bail carrying pawls 718 swings forward the four left-hand pawls will ride up over said pin and clear their latches 717, this being the same effect as produced if the handle is pulled with consecutive numbering keys down and no amount keys depressed, which effect in such connection has already been described.

Although the consecutive numbering impression devices are disabled as above described when a total or sub-total is taken, it is desirable that the consecutive numbering wheels shall perform in any such operation in the same manner as the accumulating wheels, especially when a grand total is taken, for then, of course, the consecutive numbering wheels should be left at zero. In a sub-total operation the consecutive numbering wheels should merely continue to retain the number for use with the next item recorded. They would do this if they simply remained idle but it is preferable to return them to zero along with the other wheels and then advance them. In order to insure action of the consecutive numbering wheels corresponding with that of the accumulating wheels in the taking of the total or sub-total, special means are provided for connecting together the two rocking frames 910 and 910ª, such means being under control of the regular total and subtotal keys and connections. Thus there is pivoted to a forward extension of the left-hand side plate 910ª, at the point z, a latch Z hooked at its forward end to engage the usual upper stud 958 of the frame 910, but normally held up out of engagement therewith by the pitman 914 as shown in Fig. 1. An extended straight edge of the latter abuts a similar edge of the latch to uphold the latter but upon depression of either the total or sub-total keys and consequent lowering of the pitman the latch drops by gravity over the stud 958. This obviously has the effect of connecting together the two rocking frames causing them to act as one or as the usual single accumulating frame of the regular Burroughs machine. The total key is designated by the number 265 and as usual surmounts an upstanding arm of the bell crank 227, the latter being connected by the link 911 with the pitman 914. The subtotal key is designated by the numeral 265ˢ and surmounts the upstanding arm of a bell crank lever 227ª, the latter coöperating with the total key and connections as fully disclosed in the before mentioned Vincent Patent No. 913,860.

In the taking of a total which clears the accumulator it is of course desirable that the consecutive numbering wheels be left at zero as well as the wheels which accumulated the total. Hence, provision is made for disabling the means hereinbefore described, which, in consecutive registering operations reëngage the consecutive numbering pinions with their racks shortly after the operation of the machine starts. The form of means here shown comprises an upward extension of the elongated link 910ᵉ, such extension terminating in a broadened portion $b^3$ having an inclined or cam edge, and a stud $b^4$ on the total bell crank lever 227. When the latter is depressed said stud acting upon said inclined edge cams the link rearward disengaging its lug $b$ from the stud $b'$. This does not permit disengagement of the consecutive numbering pinions from their racks as the lowering of the stud $b'$ does in a consecutive numbering operation, for the reason that when the total key bell crank lever is depressed the latch Z drops over the stud 958, as previously described.

To now recapitulate as to operation of the entire mechanism, let it be assumed that the machine is at normal, all the wheels standing at zero as indicated in Fig. 6. The consecutive numbering can start with any number from 1 to 9,999 as the machine is here shown arranged, though of course there could hardly be any reason for starting with the highest number. Referring to the example shown in Fig. 12, the consecutive numbering starts with 2,546. The first thing to be done in starting work such as illustrated by this example, is to press down the 2, 5, 4 and 6 keys in the respective rows or banks at the left of the keyboard. To set up the first amount shown in said example the 6, 7, 5 and 2 keys will then be depressed in the four banks to the right. The depression of the keys at the left of the keyboard has the effect of setting the latch $c'$ in the manner already described in detail. The depression of the keys at the right has the effect of setting the consecutive numbering mechanism illustrated in Figs. 7, 8 and 9, Fig. 8 representing the effect of depression of the keys in question. Each one of the keys which has been depressed will have drawn rearward the associated detent strip or bar 214 as in any ordinary Burroughs machine. As to the keys of the right-hand section of the keyboard this retraction of detent strips or bars lifts corresponding latches 415 so as to release the associated racks. As to the keys of the left-hand section, the latches are already lifted as previously explained but the retraction of the detent strips provides for detaining the latches when at the outset of the operation the bail rod 902 which normally held up the latches, swings forward. Retraction of the right-hand detent strips 214 thrusts the bar $d^2$ rearward, as before explained, so as to permit the four left-hand pawls 718 to act upon their latches 717. Now, upon drawing forward the operating handle the action is the same as in any regular Burroughs machine with the exception that there is no tripping of the fifth latch 717 from the left by the fourth latch. Thus the racks, with the exception of the fifth rack from the right, whose latch was not lifted, will descend distances determined by the various stops set by depression of the keys and the types will be brought to the printing line setting up the initial number 2,546 and the amount 67.52 and the number and the amount will be printed. During the descent of the racks the pinions have all been out of engagement with the same, the right-hand section of pinions having been disengaged at the outset in the regular way by the action of the pitman 914 upon the rocking frame 910, and the left-hand section of pinions having dropped out of engagement with their racks at the outset by reason of the forward rocking of the bail 922$^1$ and having remained disengaged by means of the latching forward of said bail in the manner hereinbefore described. As the handle starts rearward the accumulator frame 910 is rocked in the customary way by the pitman 914 and carries with it the frame 910$^a$ so that all the pinions are reëngaged with their racks. Then as the racks ascend the pinions will be turned forward and the amount 67.52 will be registered on the right-hand section of pinions and the first three digits of the initial number will be registered on the three pinions to the left, but 7 instead of 6 will be registered upon the fourth pinion of the left-hand set because with the rearward rocking of the main accumulator frame 910 the special pawl 413$^a$ was displaced as hereinbefore described, with the result that the rack of said fourth pinion moved a step beyond normal. After the operation has concluded this special pawl remains displaced both by reason of the fact that said main accumulator frame remains rearward and by reason of the fact that the rack stud 650 has traveled up in front of the pawl. Now, at the conclusion of the above described operation the latch $c'$ is disengaged from the bail finger $c$ in the manner already described. The initial number having been recorded along with the first amount as described, the consecutive numbering will continue without manipulation of any key of the left-hand section of the keyboard and no such key being depressed the said latch $c'$ remains inactive as the adding and consecutive numbering continues.

It will have been seen that at the conclusion of the operation the next consecutive number has already been registered. Therefore, a reversed rotation of the pinions at the left to the zero positions, as in an ordinary totaling operation, will set up in type this next consecutive number, to wit, 2,547. However, the abnormally elevated rack must not descend to normal in mesh with its wheel for the rise of the rack one step beyond normal represents movement of which the rack is capable independent of its lever 611 which carries the series of type, and so, if the rack was in mesh with the pinion from the beginning in this succeeding operation, the backward rotation of the pinion seven steps would bring the 6 type to the printing line and not the 7. The levers 611 have the usual one-step movement independent of their racks to bring the ciphers to the printing line and if this one-step movement is partaken of by a rack accompanied by a one-step backward turning of the corresponding pinion, then the type set up would be a unit short of that which said pinion had been registering. For this reason the action hereinbefore described in detail takes place, which action momentarily disengages the four left-hand pinions from their racks to give time for restoration to normal of any rack which has in the previous operation risen one step beyond normal. In the example under consideration the fourth rack to the right did so rise in the first operation. Consequently in the succeeding operation, the next amount having been set up on the left-hand section of the keyboard, in the present instance 66.52, and the handle then pulled, said fourth rack from the left descends one step while its pinion is disengaged from it. Then said pinion immediately reëngages said rack and as the operation continues this pinion and the other three of the left-hand set rotate backward to zero and the number 2547 is set up in type and printed. Meantime the four right-hand racks have descended as controlled by key stops and the amount 66.52 is printed. Now, with the start backward of the operating handle in this second operation, the special transfer pawl 413ª is again displaced as has already been described, so that the fourth rack from the left will again rise one step beyond normal and another unit will be added on the fourth pinion from the left, making the registration 2,548, it of course being understood that the four left-hand pinions remain in mesh with their racks as the latter ascend. This itemizing and consecutive numbering can continue as long as desired producing work such as illustrated in Fig. 13, it being understood that when the fourth pinion from the left passes from 9 to zero it displaces a regular transfer pawl such as illustrated in Fig. 1, so that the third pinion from the left partakes of a one-step advance which in the example given causes the four left-hand pinions to then register 2,550. Now, if a sub-total is to be struck that will be done in the ordinary way by taking a blank or spacing stroke which restores any displaced latches 411 and also restores to normal the consecutive numbering transfer mechanism illustrated in Figs. 7 to 9, and then depressing the sub-total key 265ˢ and pulling the operating handle. In the example given the left-hand pinions will at the time be registering 2553 and of course this will not be changed by the taking of the blank stroke since no amount keys are depressed. Neither will there be any printing of a consecutive number since the four left-hand pawls 718 will be disabled, as has already been explained in detail. In such blank operation the fourth rack from the left which had in the previous operation risen one step beyond normal, will be restored to normal while its pinion is out of mesh with it, and this and the other pinions of the left-hand set will be run back to zero setting up in type the next consecutive number 2,553, but it is not printed for the reason stated and at the conclusion of the operation re-appears upon the left-hand set of wheels.

In the sub-totaling operation the right-hand section of pinions will be rotated backward to zero and the sub-total printed in the ordinary way and so will the left-hand section of pinions be rotated backward to zero and then turned forward to once more display the number 2,553 as the other wheels are turned forward to again display the sub-total as 407.92 in the example of Fig. 12. The consecutive number 2,553 will not be printed for the same reason as before, viz: that the four left-hand pawls 718 are disabled through the means already described. It will be obvious that if another amount is now set up on the keyboard to be added to this sub-total the consecutive number 2,553 will be printed with it and the consecutive numbering will continue as before. Now, if a grand total is desired, the spacing stroke having been taken as above, the total key 265 will be depressed and the handle pulled. This grand total is printed in the ordinary way and the accumulating wheel left at zero and in this case the consecutive numbering wheels will also be left at zero. This of course necessitates disengagement of the consecutive numbering pinions from their racks along with the right-hand pinions. In this connection it will be remembered that depression of the total key disengages the link 910ᵉ so that when the bail 910ᴸ swings back just after the operation has started, it does not present an obstruction to disengagement of said left-hand pinions from their racks. The main accumulator frame 910 has of course remained back thus holding all pinions in mesh with their racks during the first half of the operation. The link 910ᵉ having been disabled as above described, when the said frame 910 rocks outwardly at the beginning of the return stroke of the handle the inner frame 910ᵃ rocks outward with it. Then at the conclusion of the operation when the main accumulator frame is rocked back to reëngage the right-hand section of pinions with their racks, the inner frame will be carried along by reason of the engagement of the stud 958 with the latch Z as illustrated in Fig. 5.

The usual means are employed to so rock the main frame, comprising a rearward extension 910ᶠ of the right side piece of the frame, and a stud 311ᶠ on the familiar full-stroke sector 311 acting with a camming effect on the edge of said extension. If instead of starting the work with a number requiring depression of a key in each one of the four left-hand banks, the initial number calls for depression of keys in a less number of banks, then racks of unused banks will be held up by their latches 415, it being remembered that when the initial number is being registered and recorded, the latch $c'$ is active to prevent the bail rod 902 from lifting such latches 415.

It will be seen that the construction above described is thoroughly organized to accomplish the object stated. At the same time it must be understood that the invention is not necessarily limited to this one particular form of embodiment but may be carried out in other ways.

What I claim is:

1. In an adding and listing machine, the combination of a series of adding wheels and reciprocating actuators engageable and disengageable; manipulative means for variously limiting advance of the actuators, the wheels being disengaged therefrom during such advance but engaged therewith during their return movement; zero stops for the wheels; means for keeping a section of said wheels engaged with the associated actuators during both advance and return movement of the latter; means for counting the operations of the balance of the wheels by one-step turning of a wheel of the said section; and printing mechanism including type carriers set by the actuators.

2. In an adding and listing machine, the combination of a series of adding wheels and reciprocating actuators engageable and disengageable, the actuators having excess movement in the return direction for carrying purposes; manipulative means for variously limiting advance of the actuators, the wheels being disengaged therefrom during such advance but engaged therewith during their return movement; carrying mechanism for effecting excess return movement of actuators; zero stops for the wheels; means for keeping a section of said wheels engaged with the associated actuators during both advance and return movement of the latter; means for counting the operations of the balance of the wheels by one-step turning of a wheel of the said section through excess return movement of its actuator; and printing mechanism including type carriers set by the actuators.

3. In an adding and listing machine, the combination of a series of adding wheels and reciprocating actuators engageable and disengageable, the actuators having excess movement in the return direction for carrying purposes; manipulative means for variously limiting advance of the actuators, the wheels being disengaged therefrom during such advance but engaged therewith during their return movement; carrying mechanism for effecting excess return movement of actuators; zero stops for the wheels; means for keeping a section of said wheels engaged with the associated actuators during both advance and return movement of the latter; means for counting the operations of the balance of the wheels by one-step turning of a wheel of the said section through excess return movement of its actuator; means for disengaging the counting section of wheels while such excess movement of said actuator is taken up, said section of wheels being reëngaged with its actuators for continued advance movement of the latter; and printing mechanism including type-carriers set by the actuators.

4. In an adding and listing machine, the combination of a series of adding wheels and reciprocating actuators engageable and disengageable; manipulative means for variously limiting advance of the actuators; the wheels being disengaged therefrom during such advance but engaged therewith during their return movement; zero stops for the wheels; means for keeping a section of said wheels engaged with the associated actuators during both advance and return movement of the latter; means for counting the operations of the balance of the wheels by one-step turning of a wheel of the said section; means controlled by the manipulative means associated with said section of wheels, for disabling the means which keep the latter engaged with actuators, during advance of the same; and printing mechanism including type carriers set by the actuators.

5. In an adding and listing machine, the combination of a series of adding wheels and reciprocating actuators engageable and disengageable, the actuators having excess movement in the return direction for carrying purposes; manipulative means for variously limiting advance of the actuators, the wheels being disengaged therefrom during such advance but engaged therewith during their return movement; carrying mechanism for effecting excess return movement of actuators; zero stops for the wheels; means for keeping a section of said wheels engaged with the associated actuators during both advance and return movement of the latter; means for counting the operations of the balance of the wheels by one-step turning of a wheel of the said section through excess return movement of its actuator; means for disengaging the counting section of wheels while such excess movement of said actuator is taken up, said section of wheels being reëngaged with its actuators for continued advance movement of the latter; means controlled by the manipulative means associated with said section of wheels, for disabling the means which keep the latter engaged with actuators during advance of the same; and printing mechanism including type carriers set by the actuators.

6. In an adding and listing machine, the combination of a series of adding wheels and reciprocating actuators engageable and disengageable; manipulative means for variously limiting advance of the actuators; the wheels being disengaged therefrom during such advance but engaged therewith during their return movement; zero stops for the wheels; means for keeping a section of said wheels engaged with the associated actuators during both advance and return movement of the latter; means for counting the operations of the balance of the wheels by one-step turning of a wheel of the said section; means controlled by the manipulative means associated with said section of wheels, for disabling the means which keep the latter engaged with actuators, during advance of the same; means for reënabling said latter means at the conclusion of an operation of said section of wheels under control of said manipulative means; and printing mechanism including type carriers set by the actuators.

7. In an adding and listing machine, the combination of a series of adding wheels and reciprocating actuators engageable and disengageable; manipulative means for variously limiting advance of the actuators, the wheels being disengaged therefrom during such advance but engaged therewith during their return movement; zero stops for the wheels; means for keeping a section of said wheels engaged with the associated actuators during both advance and return movement of the latter; means for counting the operations of the balance of the wheels by one-step turning of a wheel of said section; printing mechanism including type carriers set by the actuators; totaling devices for causing engagement of wheels and actuators during advance of the latter and disengagement during return; and means whereby said totaling devices disable the means aforesaid which keep the counting section of wheels engaged during return of actuators.

8. In an adding and listing machine, the combination of a series of adding wheels and reciprocating actuators engageable and disengageable; manipulative means for variously limiting advance of the actuators; the wheels being disengaged therefrom during such advance but engaged therewith during their return movement; zero stops for the wheels; means for keeping a section of said wheels engaged with the associated actuators during both advance and return movement of the latter; means for counting the operations of the balance of the wheels by one-step turning of a wheel of the said section; printing mechanism including type carriers set by the actuators, and impression devices for the several type-carriers; totaling devices for causing engagement of wheels and actuators during advance of the latter; and means whereby, in a totaling operation, the impression devices associated with the set of counting wheels are disabled.

9. In an adding and listing machine, the combination of a series of adding wheels and reciprocating actuators engageable and disengageable, the actuators having excess movement in the return direction for carrying purposes; manipulative means for variously limiting advance of the actuators, the wheels being disengaged therefrom during such advance but engaged therewith during their return movement; carrying mechanism for effecting excess return movement of actuators; zero stops for the wheels; means for keeping a section of said wheels engaged with the associated actuators during both advance and return movement of the latter; means for counting the operations of the balance of the wheels by one-step turning of a wheel of the said section through excess return movement of its actuator; means for disengaging the counting section of wheels while such excess movement of said actuator is taken up, said section of wheels being reëngaged with its actuators for continued advance movement of the latter; printing mechanism including type-carriers set by the actuators; totaling devices for causing engagement of wheels and racks during advance and disengagement during return movements of the latter; and means whereby said totaling devices disable the aforesaid means for reëngaging the counting wheels after the taking up of the excess return movement of an actuator.

10. In an adding and listing machine, the combination of racks; reciprocating carriers therefor tending to advance; latches individually restraining said carriers by engagement with the racks; pinions in a support movable to take them out of and into engagement with the racks respectively, one or more of said pinions being separately mounted in a secondary support movable independently of the first; and means for displacing the latches of the racks of said separately mounted pinions to permit their advance in mesh with the latter while other racks advance disengaged from their pinions.

11. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first and all the pinions being normally engaged with the respective racks; and means normally displacing the latches of the racks of said separately mounted pinions and holding the latter in engagement with their racks, said means operable to disengage said pinions from their racks while one-step movement of the latter beyond normal is taken up, and then reëngage said pinions with said racks before the latter advance from normal at the same time again displacing said latches.

12. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first; means for permitting one-step movement of a rack meshing with a pinion in said secondary support, as a result of pinions outside the latter moving into mesh with their racks while one or more are advanced; and means normally displacing the latches of the racks of said separately mounted pinions and holding the latter in engagement with their racks, said means operable to disengage said pinions from their racks while one-step movement of the latter beyond normal is taken up, and then reëngage said pinions with said racks before the latter advance from normal at the same time again displacing said latches.

13. In an adding and listing machine; the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first; means for permitting one-step movement of a rack meshing with a pinion in said secondary support, as a result of pinions outside the latter moving into mesh with their racks while one or more are advanced; a bail with which are engaged the latches for racks of pinions in said secondary support; a connection between the latter and said bail; and means for vibrating the bail to disengage said pinions from and reëngage them with their racks and displace said latches.

14. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first; means for permitting one-step movement of a rack meshing with a pinion in said secondary support, as a result of pinions outside the latter moving into mesh with their racks while one or more are advanced; a bail having a stud; a link connected to the secondary pinion support and shouldered to engage said stud; hooks on the latches for racks of pinions in said support, said hooks engaging the cross rod of the bail; and means for vibrating the latter.

15. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively; one or more of said pinions being separately mounted in a secondary support movable independently of the first; means for permitting one-step movement of a rack meshing with a pinion in said secondary support, as a result of pinions outside the latter moving into mesh with their racks while one or more are advanced; a bail with which are engaged the latches for racks of pinions in said secondary support; a connection between the latter and said bail; and an oscillating arm carrying a wipe-pawl to act upon said bail.

16. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first; means for permitting one-step movement of a rack meshing with a pinion in said secondary support, as a result of pinions outside the latter moving into mesh with their racks while one or more are advanced; a bail having a stud; a link connected to the secondary pinion support and shouldered to engage said stud; hooks on the latches for racks of pinions in said support, said hooks engaging the cross rod of the bail; and an oscillating arm carrying a wipe-pawl to act upon said bail.

17. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first; means for permitting one-step movement of a rack meshing with a pinion in said secondary support, as a result of pinions outside the latter moving into mesh with their racks while one or more are advanced; a bail with which are engaged the latches for racks of pinions in said secondary support; a connection between the latter and said bail; means for vibrating the bail to disengage said pinions from and reëngage them with their racks and displace said latches; and totaling devices adapted to disable the connection between the bail and the secondary support.

18. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first; means for permitting one-step movement of a rack meshing with a pinion in said secondary support, as a result of pinions outside the latter moving into mesh with their racks while one or more are advanced; a bail having a stud; a link connected to the secondary pinion support and shouldered to engage said stud; means for vibrating the bail; and totaling devices adapted to displace the aforesaid link.

19. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first; means for permitting one-step movement of a rack meshing with a pinion in said secondary support, as a result of pinions outside the latter moving into mesh with their racks while one or more are advanced; a bail having a stud; a link connected to the secondary pinion support and shouldered to engage said stud and having a cam edge; means for vibrating the bail; and a total key and connections having a stud to displace the said link by engagement with the cam-edge of the latter.

20. In an adding and listing machine, the combination of racks; reciprocating carriers therefor tending to advance; latches individually restraining said carriers by engagement with the racks; pinions in a support movable to take them out of and into engagement with the racks respectively, one or more of said pinions being separately mounted in a secondary support movable independently of the first; manipulative means for limiting advance of unlatched racks; a bail connected with the secondary pinion support and with the latches for racks of the pinion thereof; means for rocking said bail to disengage the said pinions from their racks and engage the latches with the latter; and means for holding the bail as so rocked, said means rendered operative by the manipulative means alotted to racks which engage pinions of the secondary support.

21. In an adding and listing machine, the combination of racks; reciprocating carriers therefor tending to advance; latches individually restraining said carriers by engagement with the racks; pinions in a support movable to take them out of and into engagement with the racks respectively, one or more of said pinions being separately mounted in a secondary support movable independently of the first, manipulative means for limiting advance of unlatched racks; a bail connected with the secondary pinion support and with the latches for racks of the pinions thereof; means for rocking said bail to disengage the said pinions from their racks and engage the latches with the latter; and a latch for holding the bail as so rocked, said latch rendered operative by the manipulative means allotted to racks which engage pinions of the secondary support.

22. In an adding and listing machine, the combination of racks; reciprocating carriers therefor tending to advance; latches individually restraining said carriers by engagement with the racks; pinions in a support movable to take them out of and into engagement with the racks respectively, one or more of said pinions being separately mounted in a secondary support movable independently of the first; depressible keys and connections for limiting advance of unlatched racks; a bail connected with the secondary pinion support and with the latches for racks of the pinions thereof; means for rocking said bail to disengage the said pinions from their racks and engage the latches with the latter; a latch to hold said bail as so rocked; and strips or bars rendering said latch effective, said strips or bars moved for such purpose by depression of keys associated with the racks for the pinions in the secondary support.

23. In an adding and listing machine, the combination of racks; reciprocating carriers therefor tending to advance; latches individually restraining said carriers by engagement with the racks; pinions in a support movable to take them out of and into engagement with the racks respectively, one or more of said pinions being separately mounted in a secondary support movable independently of the first; depressible keys and connections for limiting advance of unlatched racks; a bail connected with the secondary pinion support and with the latches for racks of the pinions thereof; means for rocking said bail to disengage the said pinions from their racks and engage the latches with the latter; a latch to hold said bail as so rocked; detent strips or bars for the keys, those for keys associated with the racks of pinions in said secondary frame controlling said latch to render same effective when any such keys are depressed; a bail to restore detent bars to normal; and a connection between the latter bail and the latch to disengage the latter from the first mentioned bail.

24. In an adding and listing machine, the combination of racks; reciprocating carriers therefor tending to advance; latches individually restraining said carriers by engagement with the racks; pinions in a support movable to take them out of and into engagement with the racks respectively, one or more of said pinions being separately mounted in a secondary support movable independently of the first; depressible keys and connections for limiting advance of unlatched racks; a bail connected with the secondary pinion support and with the latches for racks of the pinions thereof; means for rocking said bail to disengage the said pinions from their racks and engage the latches with the latter; a latch to hold said bail as so rocked; detent strips or bars for the keys, those for keys associated with the racks of pinions in said secondary frame having lugs; a bail whose cross-bar is engaged by said lugs; a spring connecting said bail with said latch; and means for disengaging the latter from the first mentioned bail.

25. In an adding and listing machine, the combination of racks; reciprocating carriers therefor tending to advance; latches individually restraining said carriers by engagement with the racks; pinions in a support movable to take them out of and into engagement with the racks respectively, one or more of said pinions being separately mounted in a secondary support movable independently of the first; depressible keys and connections for limiting advance of unlatched racks; a bail connected with the secondary pinion support and with the latches for racks of the pinions thereof; means for rocking said bail to disengage the said pinions from their racks and engage the latches with the latter; a latch to hold said bail as so rocked; detent strips or bars for the keys, those for keys associated with the racks of pinions in said secondary frame having lugs; a bail whose cross-bar is engaged by said lugs, and which engages the said latch; a spring connecting said bail with the latter and means for rocking the bail to disengage the latter from the first mentioned bail.

26. In an adding and listing machine, the combination of racks; reciprocating carriers therefor tending to advance; latches individually restraining said carriers by engagement with the racks; pinions in a support movable to take them out of and into engagement with the racks respectively, one or more of said pinions being separately mounted in a secondary support movable independently of the first; depressible keys and connections for limiting advance of unlatched racks; a bail connected with the secondary support and with the latches for racks of the pinions thereof; means for rocking said bail to disengage the said pinions from their racks and engage the latches with the latter; a latch to hold said bail as so rocked; detent strips or bars for the keys, those for keys associated with the racks of pinions in said secondary frame having lugs; a bail whose cross-bar is engaged by said lugs, and which engages the said latch; a spring connecting said bail with the latter; a bail to restore detent bars to normal; and a thrust-bar operated by said latter bail and acting upon the second-mentioned bail to disengage the latch from the first-mentioned bail.

27. In an adding and listing machine, the combination of a series of adding wheels and reciprocating actuators engageable and disengageable; manipulative means for variously limiting advance of the actuators, the wheels being disengaged therefrom during such advance but engaged therewith during their return movement; zero stops for the wheels; means for keeping a section of said wheels engaged with the associated actuators during both advance and return movement of the latter; means for counting the operations of the balance of the wheels by one-step turning of a wheel of said section; printing mechanism including type carriers set by the actuators; totaling devices for causing engagement of wheels and actuators during advance of the latter and disengagement during return; means whereby said totaling devices disable the means aforesaid which keep the counting section of wheels engaged during return of actuators; and means rendered effective by said totaling devices to prevent shifting of counting section of wheels independently of the balance of the wheels.

28. In an adding and listing machine, the combination of a series of adding wheels and reciprocating actuators engageable and disengageable, the actuators having excess movement in the return direction for carrying purposes; manipulative means for variously limiting advance of the actuators, the wheels being disengaged therefrom during such advance but engaged therewith during their return movement; carrying mechanism for effecting excess return movement of actuators; zero stops for the wheels; means for keeping a section of said wheels engaged with the associated actuators during both advance and return movement of the latter; means for counting the operations of the balance of the wheels by one-step turning of a wheel of the said section through excess return movement of its actuator; means for disengaging the counting section of wheels while such excess movement of said actuator is taken up, said section of wheels being reëngaged with its actuators for continued advance movement of the latter; printing mechanism including type-carriers set by the actuators; totaling devices for causing engagement of wheels and racks during advance and disengagement during return movements of the latter; means whereby said totaling devices disable the aforesaid means for reëngaging the counting wheels after the taking up of the excess return movement of an actuator; and means rendered effective by said totaling devices to prevent disengagement of counting wheels from their racks.

29. In an adding and listing machine, the combination of reciprocating racks; pinions to engage said racks respectively; a rocking support for a section of said pinions; a second rocking support for another section of pinions; a pitman for rocking the first support; totaling devices for shifting the pitman; a latch for connecting the two rocking supports, said latch normally displaced by said pitman; means for successively adding units on the second mentioned section of pinions as amounts are accumulated on the first mentioned section of pinions; means for holding the second section of pinions engaged with their racks during both advance and return of the latter while other racks advance out of mesh with their pinions; means for disabling said latter means by the totaling devices; and printing mechanism including type carriers set by the racks.

30. In an adding and listing machine, the combination of reciprocating racks; pinions to engage said racks respectively; a rocking support for a section of said pinions; a second rocking support for another section of pinions; a pitman for rocking the first support; totaling devices for shifting the pitman; a latch for connecting the two rocking supports, said latch normally displaced by said pitman; means for successively adding units on the second mentioned section of pinions as amounts are accumulated on the first mentioned section of pinions; a link connected to the second mentioned rocking support; a rocking member engaged with said link and thereby normally holding the pinions on said support in mesh with their racks; means for displacing said link by said totaling devices; and printing mechanism including type-carriers set by the racks.

31. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first; means for permitting one-step movement of a rack meshing with a pinion in said secondary support, as a result of pinions outside the latter moving into mesh with their racks while one or more are advanced; a bail with which are engaged the latches for racks of pinions in said secondary support; a connection between the latter and said bail; means for vibrating the bail to disengage said pinions from and reengage them with their racks and displace said latches; totaling devices adapted to disable the connection between the bail and the secondary support; and a latch rendered effective by said totaling device to connect the primary and secondary supports.

32. In an adding and listing machine, the combination of racks; reciprocating carriers therefor tending to advance, the racks being spring-drawn to move a step beyond normal independently of their carriers but normally restrained from so doing; pinions in a support movable to take them out of and into engagement with the racks respectively, one or more of said pinions being separately mounted in a secondary support movable independently of the first; means for permitting one-step movement of a rack meshing with a pinion in said secondary support, as a result of pinions outside the latter moving into mesh with their racks while one or more are advanced; a bail having a stud; a link connected to the secondary pinion support and shouldered to engage said stud; means for vibrating the bail; totaling devices adapted to displace the aforesaid link; and a latch rendered effective by said totaling device to connect the primary and secondary supports.

33. In an adding and listing machine, the combination of a series of adding wheels and reciprocating actuators engageable and disengageable; manipulative means for variously limiting advance of the actuators, the wheels being disengaged therefrom during such advance but engaged therewith during their return movement; zero stops for the wheels; means for keeping a section of said wheels engaged with the associated actuators during both advance and return movement of the latter; means for counting the operations of the balance of the wheels by one-step turning of a wheel of the said section; printing mechanism including type-carriers set by the actuators, and impression devices for the several type-carriers comprising hammers, restraining detents and pawls to displace the latter; totaling devices for causing engagement of wheels and actuators during advance of the latter; and means whereby, in a totaling operation, the impression devices associated with the set of counting wheels are disabled, said latter means comprising a lever for displacing pawls and devices rendering said lever effective in the totaling operation.

34. In an adding and listing machine, the combination of rows of depressible keys; strips or bars one for each row and adapted to be shifted by depression of keys and certain of them having lugs; a bail engaged by said lugs; a thrust bar connected to the said bail; an abutment to obstruct said bar laterally until the latter is moved endwise by depression of a key; a lever coupled to said bar and having a laterally projecting pin; impression devices including hammers, detents and pawls, certain of the latter engaged by said pin; type carriers; racks thereon; pinions to engage the racks; separate supports for different sections of pinions, one section of the latter corresponding with the pawls engaged by the aforesaid pin; means for shifting the support for the other section of pinions to engage the latter with and disengage them from their racks; totaling devices to adjust said latter means for varying the period of engagement between racks and pinions; means for adding units upon the other section of pinions to count accumulating operations of the first section; means for keeping said other section of pinions engaged with its racks during advance thereof from normal in such accumulating operations; and means for disabling said latter means by the totaling devices and for connecting the pinion supports together by the latter.

35. In an adding and listing machine, the combination of racks; reciprocating carriers therefor tending to advance, the racks being spring-drawn to move a step beyond normal independently of their carriers but normally restrained from so doing; manipulative means for variously limiting advance of racks from normal; pinions in a support movable to take them out of and into engagement with the racks respectively, one or more of said pinions being separately mounted in a secondary support movable independently of the first; and means for permitting one-step movement of a rack meshing with a pinion in said secondary support, as a result of pinions outside the latter moving into mesh with their racks while one or more are advanced, said latter means including a member under control of the aforesaid manipulative means.

36. In an adding and listing machine, the combination of racks; reciprocating carriers therefor tending to advance, the racks being spring-drawn to move a step beyond normal independently of their carriers but normally restrained from so doing; manipulative means for variously limiting advance of racks from normal; pinions in a support movable to take them out of and into engagement with the racks respectively, one or more of said pinions being separately mounted in a secondary support movable independently of the first; and means for permitting one-step movement of a rack meshing with a pinion in said secondary support, as a result of pinions outside the latter moving into mesh with their racks while one or more are advanced, said latter means comprising a pawl normally obstructing the rack and carrying a spring-held abutment piece, a tappet-piece on the primary pinion support, and a member controlled by the aforesaid manipulative means and adapted to bring about effective engagement between the tappet piece and the abutment piece.

37. In an adding and listing machine, the combination of racks; reciprocating carriers therefor tending to advance, the racks being spring-drawn to move a step beyond normal independently of their carriers but normally restrained from so doing; manipulative means for variously limiting advance of racks from normal; pinions in a support movable to take them out of and into engagement with the racks respectively, one or more of said pinions being separately mounted in a secondary support movable independently of the first; and means for permitting one-step movement of a rack meshing with a pinion in said secondary support, as a result of pinions outside the latter moving into mesh with their racks while one or more are advanced, said latter means comprising a pawl normally obstructing the rack and carrying a spring-held abutment piece, a tappet-piece pivoted on the primary pinion support and overlying said abutment piece, and a lever operated by the aforesaid manipulative means and adapted to displace the abutment piece and tappet-piece so that upon reciprocation of the primary pinion support they will coact to displace the pawl.

38. In an adding and listing machine, the combination of racks; reciprocating carriers therefor tending to advance, the racks being spring-drawn to move a step beyond normal independently of their carriers but normally restrained from so doing; depressible keys and connections for variously limiting advance of racks from normal; strips or bars shifted by said keys; a bail operated by said strips or bars; pinions in a support movable to take them out of and into engagement with the racks respectively, one or more of said pinions being separately mounted in a secondary support movable independently of the first; and means for permitting one-step movement of a rack meshing with a pinion in said secondary support, as a result of pinions outside the latter moving into mesh with their racks while one or more are advanced; said latter means comprising a pawl normally obstructing the rack and carrying a spring-held abutment-piece, a tappet-piece pivoted on the primary pinion support and overlying said abutment-piece, and a lever operated by the aforesaid bail and adapted to displace the abutment piece and tappet-piece so that upon reciprocation of the primary pinion support they will coact to displace the pawl.

39. In an adding and listing machine, the combination with means for setting up, accumulating and printing successive amounts; of consecutive numbering means comprising setting up, accumulating and printing devices whereby a basic number may be registered and recorded, devices for successively adding a unit to said basic number registration as amounts are successively registered and recorded, and devices for successively recording such increased registration in connection with the recording of amounts.

GEORGE B. PUTNAM.

Witnesses:
A. H. NICHOLS,
JAMES P. NICHOLS.